(12) United States Patent
Inoko et al.

(10) Patent No.: US 8,726,345 B2
(45) Date of Patent: May 13, 2014

(54) COMMUNICATION SYSTEM, LINE PROVIDING APPARATUS AND COMMUNICATION METHOD

(75) Inventors: Katsutoshi Inoko, Kawasaki (JP); Natsuko Arai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 315 days.

(21) Appl. No.: 12/814,981

(22) Filed: Jun. 14, 2010

(65) Prior Publication Data
US 2010/0306822 A1 Dec. 2, 2010

Related U.S. Application Data

(63) Continuation of application No. PCT/JP2007/075145, filed on Dec. 27, 2007.

(51) Int. Cl.
*H04L 29/06* (2006.01)
(52) U.S. Cl.
CPC .................................. *H04L 63/08* (2013.01)
USPC ..................................... 726/2; 726/3; 726/27
(58) Field of Classification Search
None
See application file for complete search history.

(56) References Cited

U.S. PATENT DOCUMENTS

| 5,864,757 | A | 1/1999 | Parker |
| 6,124,799 | A | 9/2000 | Parker |
| 2003/0055882 | A1* | 3/2003 | Kawamura ................... 709/203 |
| 2003/0232617 | A1* | 12/2003 | Ishihara et al. ............... 455/411 |
| 2004/0003032 | A1* | 1/2004 | Ma et al. ...................... 709/203 |
| 2004/0054783 | A1 | 3/2004 | Takemura et al. |
| 2008/0062900 | A1* | 3/2008 | Rao ............................. 370/310 |
| 2008/0077524 | A1* | 3/2008 | Greene ........................... 705/40 |
| 2008/0144590 | A1* | 6/2008 | Rantanen et al. ............. 370/338 |
| 2008/0212503 | A1* | 9/2008 | Lipford et al. ................ 370/310 |
| 2009/0254930 | A1* | 10/2009 | Lo et al. ........................... 725/2 |
| 2011/0026501 | A1* | 2/2011 | Sharaga et al. ............... 370/338 |

FOREIGN PATENT DOCUMENTS

| JP | 5115081 | 5/1993 |
| JP | 11501182 | 1/1999 |
| JP | 2001345935 | 12/2001 |
| JP | 2003163974 A | 6/2003 |
| JP | 2003174467 A | 6/2003 |
| JP | 2003229961 | 8/2003 |
| JP | 2004139434 | 5/2004 |

(Continued)

OTHER PUBLICATIONS

International Search Report dated Feb. 19, 2008 in corresponding International application No. PCT/JP2007/075145.

(Continued)

*Primary Examiner* — Benjamin Lanier
(74) *Attorney, Agent, or Firm* — Smith, Gambrell & Russell, LLP

(57) ABSTRACT

A line providing apparatus has an acceptance processor accepting a line use request from the terminal apparatus, a contract determiner determines a state of conclusion of a first contract, a second contract or a combined contract obtained by substantially combining the first contract and the second contract at the terminal apparatus which is a source of the line use request accepted by the acceptance processor, and an assistance processor performing an assisting process for conclusion of a contract found not to be concluded according to a result of determination on the state of conclusion of the first contract, the second contract or the combined contract by the contract determiner, whereby the user of the terminal apparatus which does not yet conclude can sign the contract for the communication service or the information providing service through the terminal apparatus.

1 Claim, 8 Drawing Sheets

(56) References Cited

FOREIGN PATENT DOCUMENTS

JP 2004320570 11/2004
JP 2004343500 12/2004

OTHER PUBLICATIONS

IEEE Std 802.16e-2005 and IEEE Std 802.16-2004/Cor1-2005 (Amendment and Corrigendum to IEEE Std 802.16-2004) IEEE Standard for Local and metropolitan area networks, Part 16? Air Interface for Fixed and Mobile Broadband Wireless Access Systems, Amendment 2: Physical and Medium Access Control Layers for Combined Fixed and Mobile.
Notification of Reasons for Refusal dated Oct. 25, 2011 received in Japanese Patent Application No. 2009-547830.

* cited by examiner

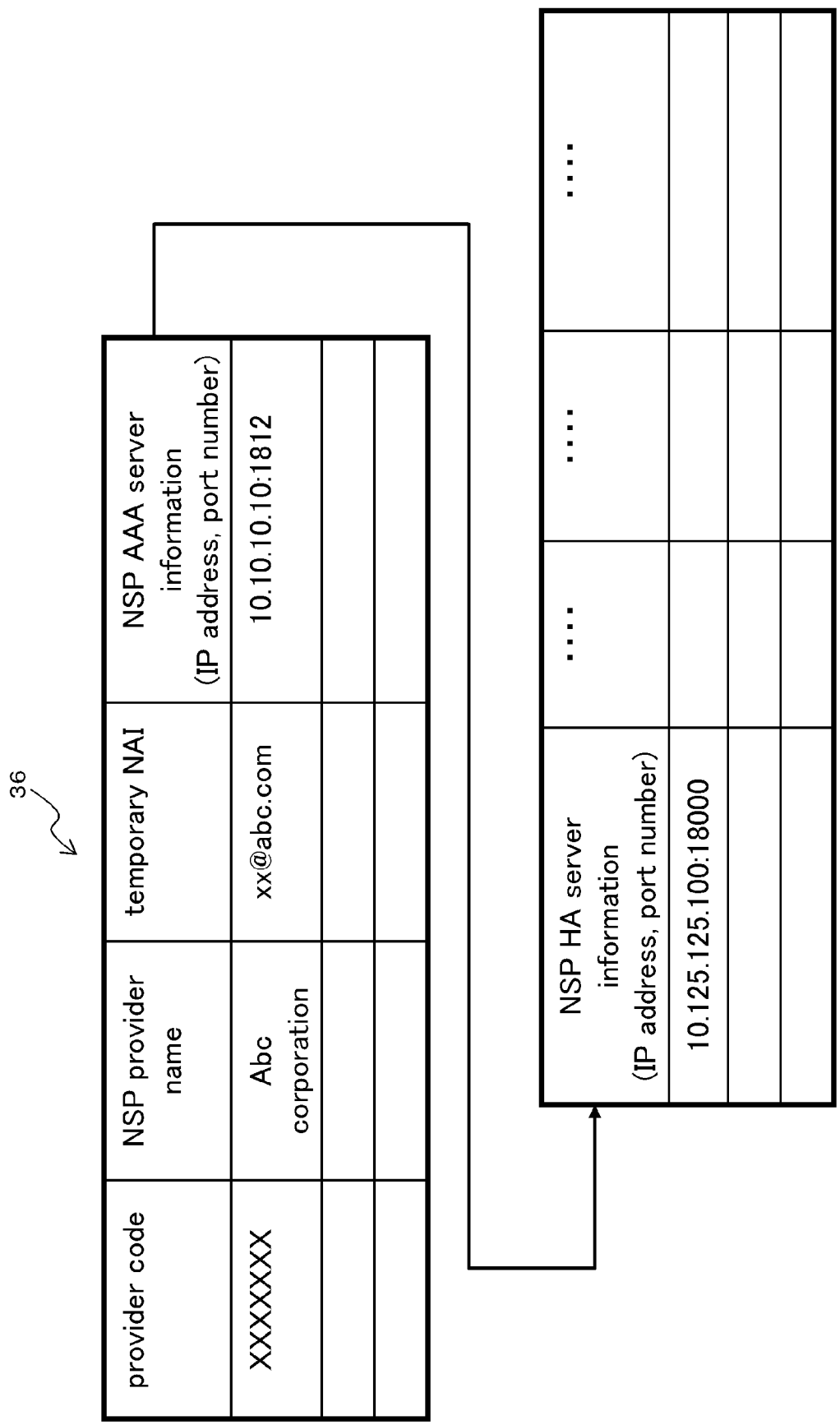

COMMUNICATION SYSTEM, LINE PROVIDING APPARATUS AND COMMUNICATION METHOD

CROSS-REFERENCE TO RELATED APPLICATION

This application is a continuation Application of a PCT international application No. PCT/JP2007/075145 filed on Dec. 27, 2007 in Japan, the entire contents of which are incorporated by reference.

FIELD

The embodiments discussed herein are related to a communication system, a line providing apparatus and a communication method.

BACKGROUND

With a full-scale introduction of Worldwide Interoperability for Microwave Access (WiMAX), it is supposed, as a mode of spreading terminal apparatuses in the WiMAX system, that spreading of the terminal apparatus is promoted by selling the terminal apparatuses in large-scale electric appliance stores like wireless LAN (Local Area Network) cards or purchasing the terminal apparatuses in abroad by the users, not in a mode where the individual provider sells or lends the terminal apparatuses like the existing cellular terminals or wire broadband terminals (ADSL modems, optical line accommodated terminals).

Additionally, there is a background in the communication business that the way of contract concluding process shifts from a business mode where the providers keep shops for the contracts to a business mode where the contracts are concluded online. For these reasons, it is supposed that the subscription contract between the user of a terminal apparatus purchased at a large-scale electric appliance store as above and a network access provider (NAP) in WiMAX or a subscription contract between a network service provider (NSP) and the same is concluded mainly online.

However, the ADSL line/optical line contract with respect to the present wire broadband, and the internet service provider (ISP) contract are concluded online from a connectable PC other than the terminal to be concluded, or over telephone, or at the shop because the provider individually lends or sells terminal equipments (modems or the like). Further, with respect to the wireless LAN, the user needs to beforehand obtain information necessary for a connection after going through an online contract from a connectable PC (Personal Computer), a contract over telephone, or a contract at the shop such as a convenience store, a large-scale electric appliance shop or the like. Therefore, a business mode is not yet attained, in which the user sings an online contract by using a purchased terminal when purchasing the terminal apparatus.

As a known technique, there is a technique in a non-patent document 1 below.

Non-Patent Document 1: IEEE802.16e

SUMMARY (1) According to an aspect of the embodiments, a system includes a communication system including: a terminal apparatus that performs a wireless communication, a line providing apparatus that provides a wireless line whose wireless communication area is defined to the terminal apparatus under a first contract with the terminal apparatus, and an information service providing apparatus that provides an information service to the terminal apparatus over the wireless line provided by the line providing apparatus under a second contract with the terminal apparatus, wherein the line providing apparatus including: an acceptance processor that accepts a line use request from the terminal apparatus, a contract determiner that determines a state of conclusion of the first contract and the second contract or a combined contract obtained by substantially combining contents of the first contract and the second contract at the terminal apparatus which is a source of the line use request accepted by the acceptance processor, and an assistance processor that performs an assisting process for concluding a contract found to be not yet concluded according to a result of determination on the state of conclusion of the first contract, the second contract, or the combined contract by the contract determiner.

(2) According to an aspect of the embodiments, a method includes a communication method including: outputting a line use request from a terminal apparatus performing a wireless communication to a line providing apparatus providing a wireless line whose wireless communication area is defined to the terminal apparatus under a first contract with the terminal apparatus, accepting the line use request from the terminal apparatus by the line providing apparatus, determining a state of conclusion of the first contract with the terminal apparatus which is a source of the accepted line use request, a state of conclusion of a second contract for providing an information service between the terminal apparatus and an information service providing apparatus providing the information service over the wireless line provided by the line providing apparatus, or a state of conclusion of a combined contract obtained by substantially combining contents of the first contract and the second contract, and performing an assisting process for a concluding process of a contract found to be not yet concluded according to a result of determination on the state of conclusion of the first contract, the second contract or the combined contract.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 4 is a diagram illustrating a table in an ASN-GW according to the embodiment;

DESCRIPTION OF EMBODIMENTS

Hereinafter, embodiments will be described with reference to the drawings. Note that the embodiments are not limited to the embodiments to be described below, but may be modified in various ways without departing from sprits and scope of the embodiments, as a matter of course.

[A] Description of an Embodiment

[A] Constitution

Figure 1:
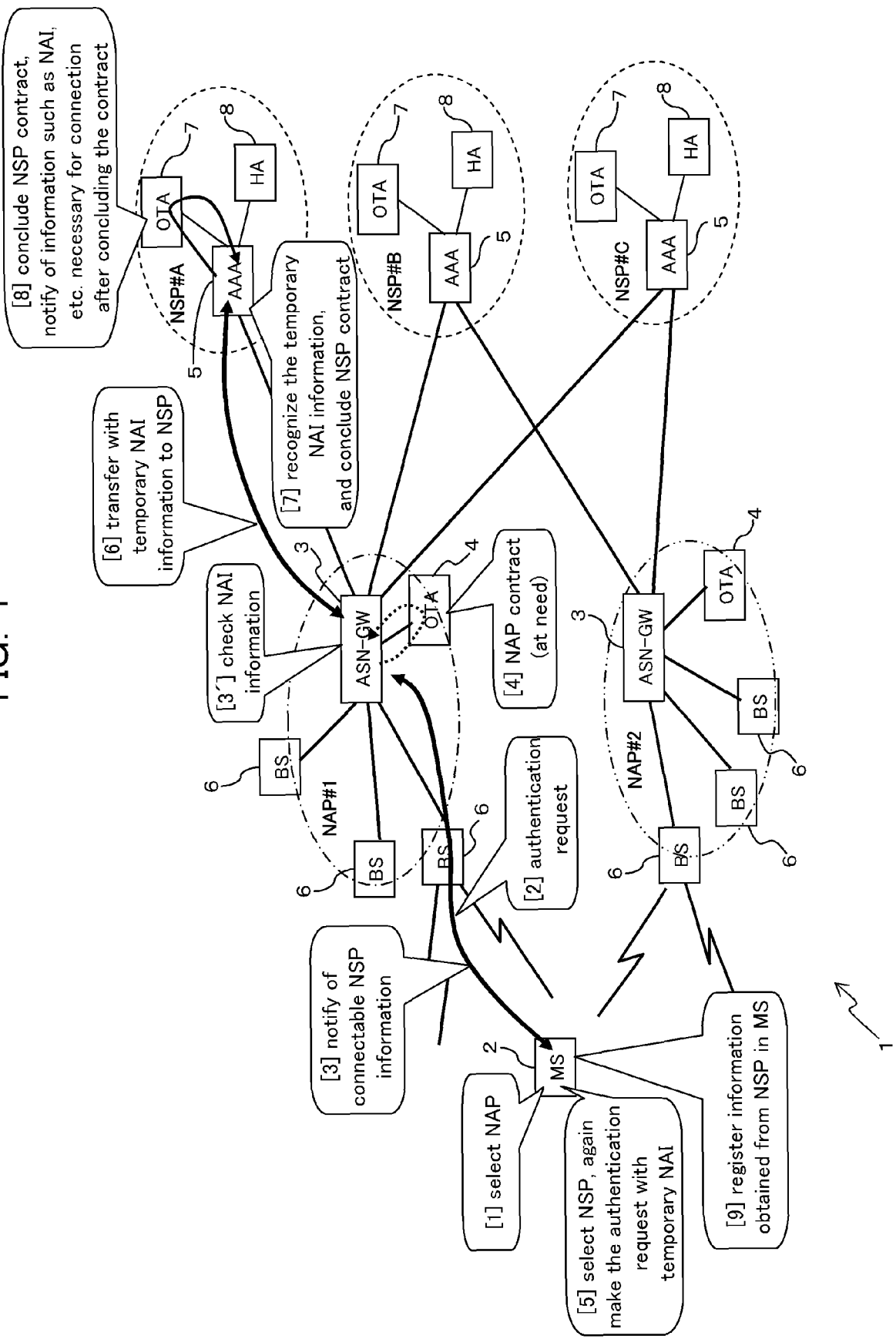
FIG. 1 is a diagram illustrating a communication system according to an embodiment.

FIG. 1 is a diagram illustrating a communication system according to an embodiment. A communication system 1 illustrated in FIG. 1 has an MS (WiMAX Mobile Station) 2 as a terminal apparatus of a user, an access service network gateway (ASN-GW) 3, a contract process server 4, an authentication server (AAA) 5, and a BS (Base Station) 6 as a base station for transmitting and receiving a WiMAX wireless radio wave to and from the terminal apparatus 2. The communication system 1 proceeds a contract process online with an MS 2 which does not yet sign the contract, with a request from the MS 2 as an opportunity, thereby enabling communications.

Here, the MS 2 performs a wireless communication by WiMAX with, for example, the BS 6. The ASN-GW 3 accommodates a plurality of the BSs 6, for example, to perform an accepting process of a connection request (authentication request) at the time of the initial connection with the MS 2. The contract process server (OTA: Over The Air) 4 is connected to the ASN-GW 3 to perform a contract process on the MS 2 which does not yet sign an NAP (network access provider) contract. In other words, the OTA 4 is a first contract processing apparatus connected to the ASN-GW 3 to perform a concluding process of a first contract (NAP contract).

The authentication server 5 confirms a state of contract of the network service provider (NSP).

As illustrated in FIG. 1, each of a plurality of different network access providers (NAP#1 and NAP#2) can have an ASN-GW 3 and a plurality of the BSs 6 connected to the ANS-GW 3. Each of the NAPs is connected to an NSP corresponding to an information service which can be provided to the MS 2 to be connected by wireless under the providers' contract (contract between the NAP and the NSP) among the plural network service providers (NSPs #A to #C).

In concrete, in the example illustrated in FIG. 1, the authentication servers 5 of NSPs #A to #C are connected to the ASN-GW 3 of the NAP #1 as network service providers of information services which can be provided to the MS 2. On the other hand, the authentication servers 5 of the NSPs #B and #C are connected to the ASN-GW 3 of the NAP #2. Whereby, the information services can be provided to the terminal apparatus 2 from any of the NSPs #A to #C via the NAP #1, while the information services can be provided to the terminal apparatus 2 from the NSPs #B to #C via the NAP #2.

As illustrated in FIG. 1, each of the NSPs #A to #C has a contract process server 7 connected to the authentication server 5 to perform a contract process, and an HA server 8 practically operating the information providing service, along with the authentication server 5.

Therefore, the ASN-GW 3 in each of the NAPs and the BS 6 associate with each other to constitute a line providing apparatus providing a wireless line whose wireless communication area is defined to the MS 2 under a first contract (NAP contract) with the MS 2. On the other hand, the authentication server 5, the contract process server 7 and the HA server 8 in each of the NSP associate with one another to constitute an information providing apparatus providing an information service to the MS 2 over a wireless line provided by the line providing apparatuses 3 and 6 under a second contract (NSP contract) with the MS 2.

Figure 2:
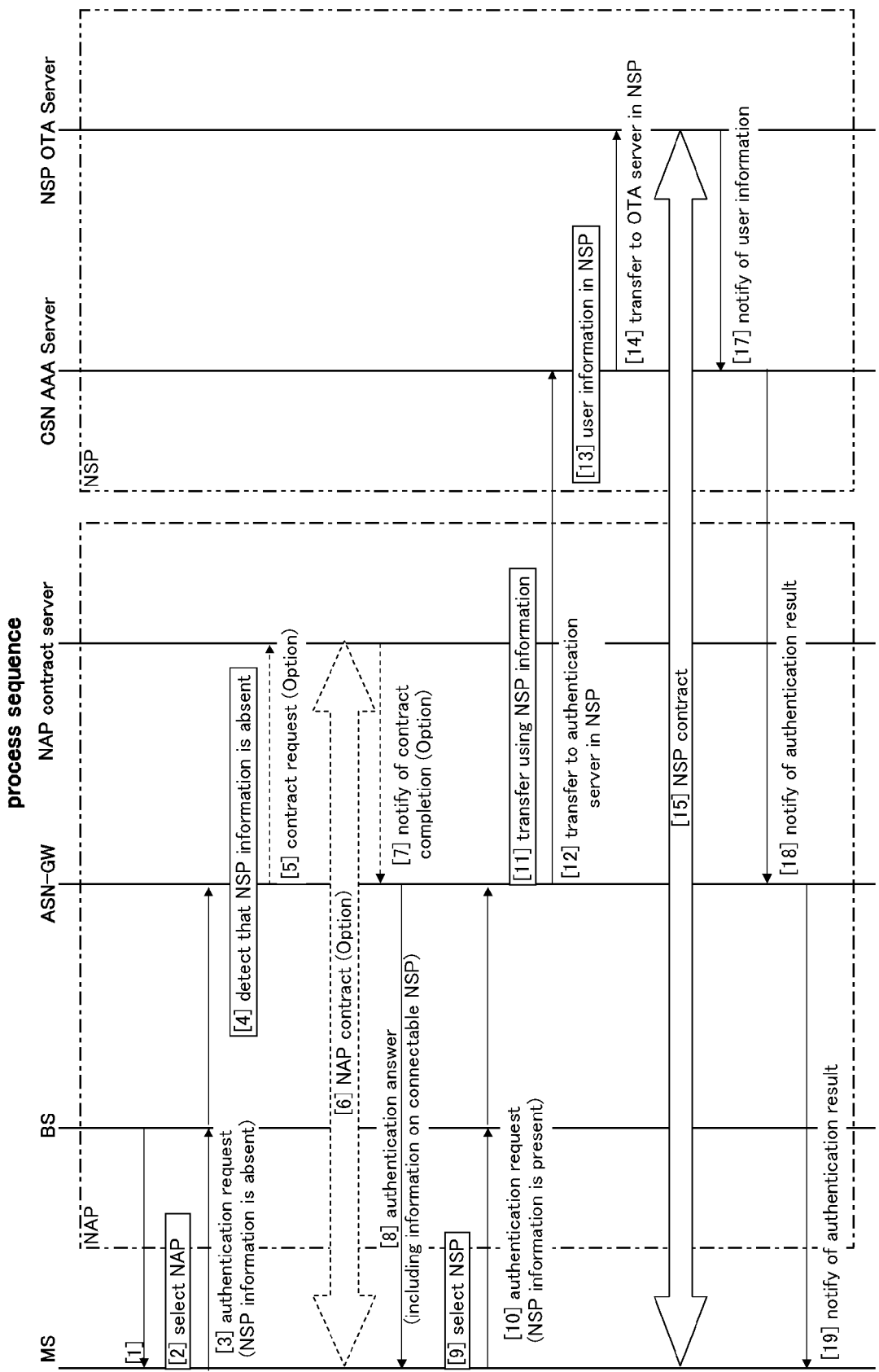
FIG. 2 is a sequence diagram for illustrating an example of operation of the communication system according to the embodiment.

[1] to [9] in FIG. 1 and a process sequence illustrated in FIG. 2 are diagrams illustrating an example of signal exchanges to conclude the above-mentioned first contract and the second contract with the MS 2. Traditionally, in order that the MS 2 can enjoy an information service through the NAP and the NSP, the user of an MS 2 needs to beforehand sign an NAP contract at a shop where the user purchases the MS 2. In this embodiment, the user can sign not only the NAP contract but also the NSP contract online, as illustrated in FIGS. 1 and 2.

The MS 2 displays a screen to enable the user to select an NAP (ASN-GW3 in the NAP) to which the wireless line is to be set, and outputs a line use request to the selected ASN-GW 3. For example, the user starts an application for WiMAX on the MS 2. The started application receives a WiMAX wireless signal transmitted from the BS 6, extracts information on an available NAP from provider information contained in the received WiMAX wireless signal, and displays the information on the MS 2 (see [1] in FIG. 2).

When the user selects and designates an NAP to be used from the displayed NAP information (see [1] in FIG. 1 and [2] in FIG. 2), the application of the MS 2 transmits a connect request message (line use request) with a wireless signal to the BS 6 of the designated NAP (see [2] in FIG. 1 and [3] in FIG. 2). As the connect request message, connect request identification information (NAI: Network Access Identifier) on the MS 2 can be contained for the purpose of authentication at the NAP and the NSP.

An MS 2 which has signed neither the NAP contract nor the NSP contract can insert at least information (NAP information) for authenticating the connect request sent from the MS 2 to the NAP designated as above, as the NAI information. An MS 2 which has already signed both the NAP contract and the NSP contract can insert information (NSP information) for authenticating a connect request sent from the MS 2 at an NSP which is to provide the information service that the MS 2 desires, other than the above NAP information (see [3] in FIG. 1).

Moreover, in order to accomplish the above functions, the MS 2 has a constitution for transmitting and receiving a WiMAX wireless signal, a processor, a memory and the like for executing applications, and a constitution for displaying the NAP information in order that the user can select and designate.

The BS 6 having received the connection request message from the MS 2 transfers the connection request message to the ASN-GW 3. The ASN-GW 3 performs an authenticating process on the message (see [3'] in FIG. 1). In concrete, the ASN-GW 3 extracts information (information used to authenticate whether the MS 2 has already signed the NSP contract or not, that is, NSP information) about an NSP to which the MS 2 desires to connect, as the NAI information.

On this occasion, when the connection request message is from an MS 2 that does not yet sign the NSP contract, it is detected as a result of the authentication that the NSP information is absent because the NSP information is not contained (see [4] in FIG. 2). In this case, the ASN-GW 3 assists the NSP contract (and the NAP contract) with the MS 2.

In concrete, when the NSP information as the NAI contained in the connection request message from the MS 2 indicates a provider not connected to the NAP or when the NSP information deviates from the pattern and is found to be abnormal, the ASN-GW 3 judges that the MS 2 from which the connection request message has been received is a terminal apparatus which does not yet sign the contract.

The ASN-GW 3 notifies the MS 2 via the BS 6 of information on NSPs to which the ASN-GW 3 in the NAP can be connected, as assistance to the MS 2 in concluding the NSP contract (see [5] in FIG. 1 and [8] in FIG. 2). In concrete, the ANS-GW 3 embeds information on connectable NSPs in an answer responsive to the connection request message, and sends back the answer to the MS 2. Incidentally, the information on NSPs connectable via the NAP is beforehand registered and retained in a table (see reference numeral 36 in FIG. 4 to be described later) in the ASN-GW 3.

When the MS 2 having received the answer to the connection request from the ASN-GW 3 detects that the NSP information is embedded in the answer, the MS 2 displays the NSP information in association with an application in the MS 2. The user of the MS 2 selects an NSP from which the service is provided from the displayed NSP information (see [9] in FIG. 2). The application of the MS 2 embeds temporary NAI information (that is, NAI information for enabling the MS 2 to connect with an NSP with which the MS 2 does not yet sign the contract) that can specify the selected NSP in the connection request message, and again transmits the connection request message (see [5] in FIG. 1 and [10] in FIG. 2). The temporary NAI information can be taken out from information on the NAP embedded in the answer from the ASN-GW 3.

The ASN-GW 3 having received the re-transmitted connection request message extracts the connection request message from the temporary NAI information contained in the received message and transfers the connection request message to the authentication server (AAA server) 5 of a corresponding NSP (see [6] in FIG. 1, and [11] and [12] in FIG. 2).

Thereafter, the authentication server 5 in the NSP recognizes that the NAI information in the received connection request message (authentication request message) is temporary NAI information, and finds that the message is a request from a terminal apparatus 2 which does not yet sign the contract with the NSP (see [7] in FIG. 1, and [13] in FIG. 2). The authentication server 5 transfers the temporary NAI information to the contract server (OTA server in the NSP) 7, and performs a concluding process of the NSP contract with the terminal apparatus 2 (see [8] in FIG. 1, and [14] and [15] in FIG. 2).

Upon concluding the NSP contract, it is possible to conclude a combined contract with the NAP contract. Further, as a state of contract at the terminal apparatus 2 receiving the temporary NAI information, it can be supposed that another NSP contract has been concluded but this NAP contract is not yet concluded. In such case, the concluding process of the NAP contract can be performed at the contract server 7. In other words, the contract server 7 can suitably perform the necessary concluding process with the terminal apparatus 2. The contract process between the contract server 7 and the terminal apparatus 2 is done in the existing process such as a method using web or the like.

After the contract is concluded, the contract server 7 notifies the authentication server 5 of contents of the contract and information necessary for a connection (see [8] in FIG. 1, and [17] in FIG. 2). The authentication server 5 in the NSP takes out information necessary for a connection from information received from the contract server 7, embeds the information in a result notification signal (response signal) responsive to the connection request, and sends back the signal to the MS 2 via the ASN-GW 3 and BS 6 (see [18] in FIG. 2).

The MS 2 takes out the NAI information and the NAP information assigned to the MS 2 itself from the received information, and registers and retains the NAI information and the NAP information therein (see [9] in FIG. 1). Thereafter, when the MS 2 is connected to the HA server 8 in the NSP in order to receive the information service, the MS 2 performs a communication, with a connection request message based on the obtained NAI information and NAP information as a start.

When conclusion of the NAP contract cannot be completed in the contract server 7, the authentication server 5 sends an answer of dismissal of the connection request to the MS 2 as an authentication result notification (see [19] in FIG. 2).

What kind of the contract is concluded with the MS 2 at the NSP can be suitably determined according to a business mode of the contract procedure. For example, a combined contract of NAP and NSP is possible. Alternatively, when the MS 2 has already signed the NSP contract but not yet sign the NAP contract, the MS 2 can sign only the NAP contract. If the NAP contract is unavailable in such case, an answer of dismissal to the connection request is made to the MS 2.

[A2] Constitution and Operation of the ASN-GW in NAP

Figure 3:
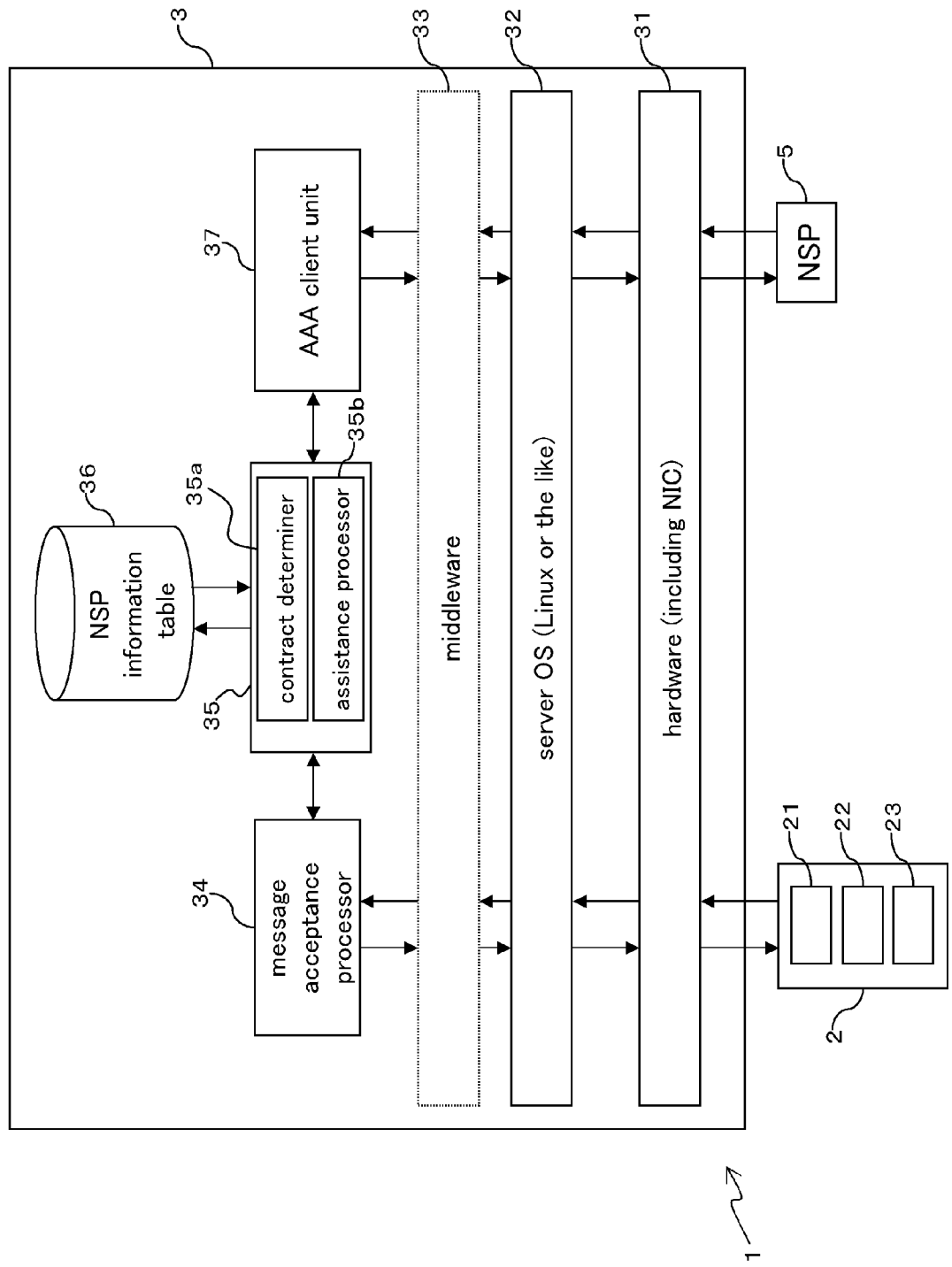
FIG. 3 is a diagram illustrating essential parts of the communication system according to the embodiment.

In order to accomplish functions as the above communication system 1, the ASN-GW 3 has a constitution as illustrated in FIG. 3. As illustrated in FIG. 3, the ASN-GW 3 has a hardware unit 31 including an NIC (Network Interface Card) used to connect the NAP to an NSP, an operating system (OS) unit 32, a middleware unit 33 performing the TCP/IP process, the message process, etc., a message acceptance processor 34, a connection information processor 35, an NSP information table 36, and an AAA client unit 37.

The hardware unit 31 converts an Ethernet (registered trademark) frame received from the outside (here, the MS 2 or the authentication server 5 in an NSP) into an IP packet, and sends the IP packet to the OS unit 32. The hardware unit 31 converts an IP packet received from the OS unit 32 into an Ethernet frame, and transmits the Ethernet frame to the outside.

The message acceptance processor 34 accepts a connection request message from the MS 2 via the hardware unit 31, the OS unit 32 and the middleware unit 33, while transmitting a signal inputted from the connection information processor 35 and destined for the MS 2 via the middleware unit 33, the OS unit 32 and the hardware unit 31. Accordingly, the message acceptance processor 34 is an acceptance processor accepting a line use request from the MS 2.

Figure 5B:
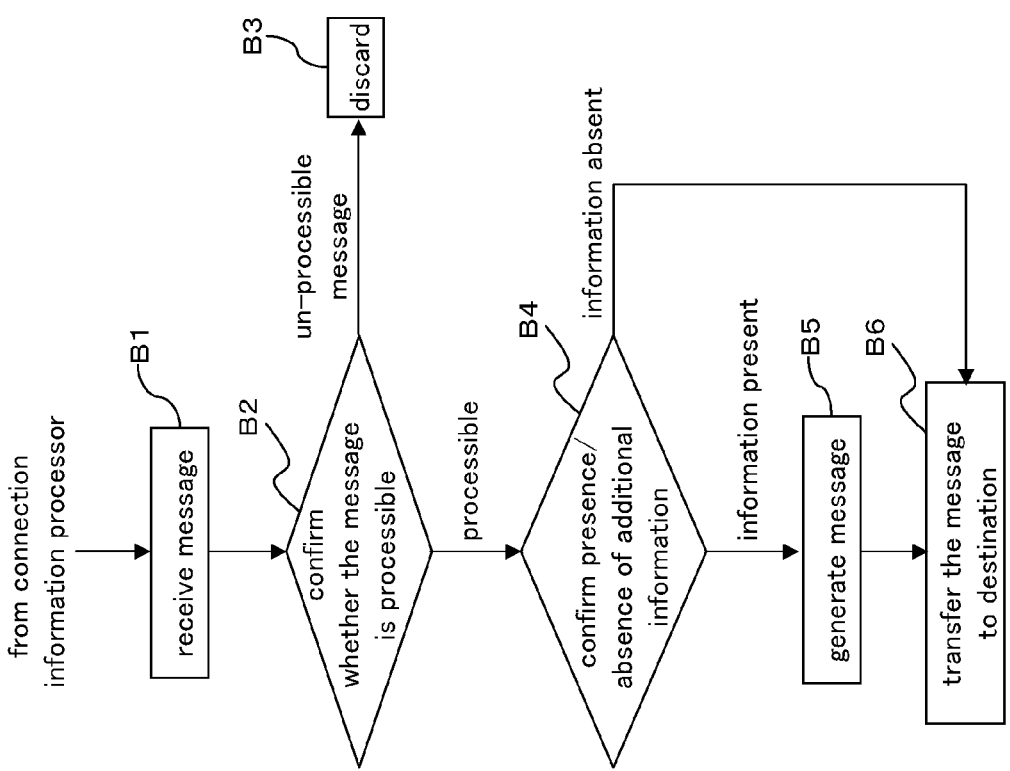
FIGS. 5A and 5B are flowcharts for illustrating operations of the ASN-GW according to the embodiment.
Figure 5A:
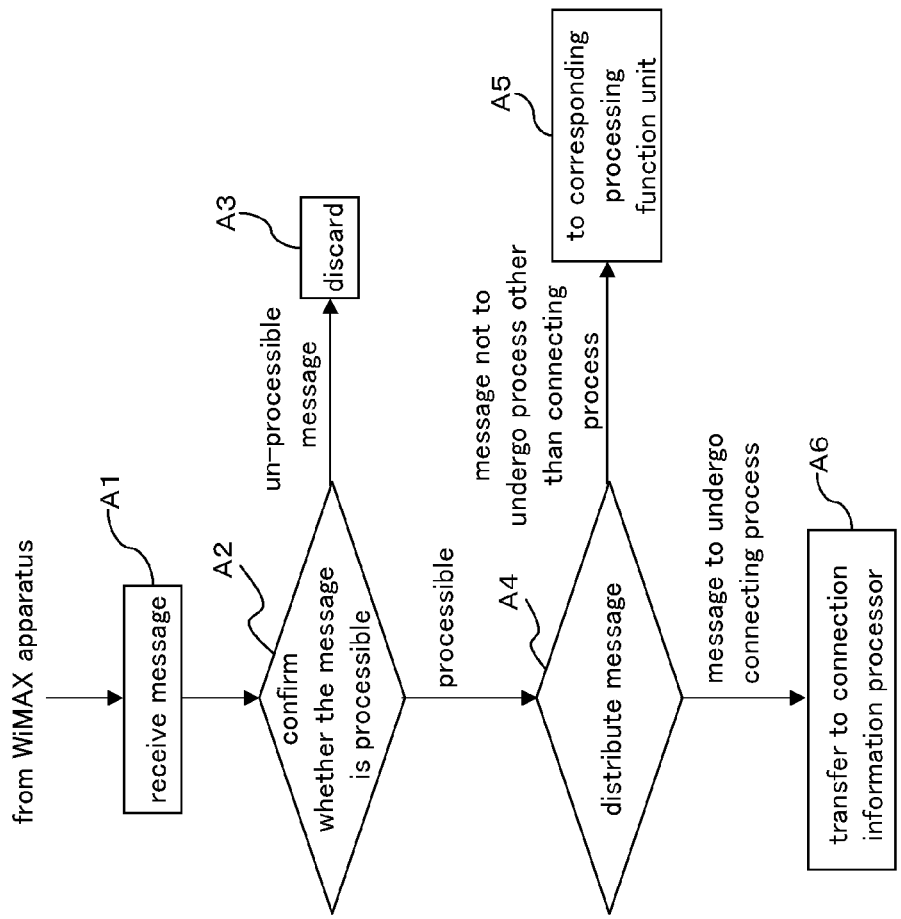

FIGS. 5A and 5B are flowcharts for illustrating operations of the message acceptance processor 34. As illustrated in FIG. 5A, when receiving a message from the MS 2 of WiMAX (step A1), the message acceptance processor 34 confirms whether the process on the received message is possible or not on the basis of NAI information or the like on the received message (step A2).

When the process on the message is impossible, the message acceptance processor 34 discards the message (from "un-processible message" route at step A2 to step A3). When the process is possible, the message acceptance processor 34 distributes the received message to a function unit performing a process corresponding to a type of the message (from "processible" route at step A2 to step A4).

In other words, when the message is to undergo a process other than the connection process, the message acceptance processor 34 transfers the message to a corresponding function unit (from "message to undergo a process other than the connection process" route at step A4 to step A5). When the message is a connection process message, the message acceptance processor 34 transfers the message to the connection information processor 35 (from "message to undergo connection process" route at step A4 to step A6).

When receiving a message to be transmitted to the MS 2 from the connection information processor 35 as illustrated in FIG. 5B (step B1), the message acceptance processor 34 confirms whether the message can be processed on the basis of NAI information on the received message ("processible"

route at step B2), and confirms whether information to be added by the message acceptance processor 34 is present or absent (step B4).

When additional information is present, the message acceptance processor 34 generates a message containing the additional information (from "information present" route at step B4 to step B5). When additional information is absent, the message acceptance processor 34 transmits the message intact to the MS 2 which is the destination (from "information absent" route at step B4 to step B6). When the message is found to be an un-processible message as a result of the confirmation at the above step B2, the message is discarded (step B3).

When the message is discarded at the message acceptance processor 34 as above, discard of the message can be notified to the transmission source. For example, when the connection request message from the MS 2 is discarded (step A3), discard of the message is notified to the MS2 and the online contract is dismissed. In concrete, as illustrated in FIG. 8C, when information used to authenticate the MS 2 for an NSP which does not conclude a providers' contract with this NAP is not contained in the NSP information which is the NAI information, the NAP notifies of an answer that the online contract is dismissed (rejected) in responsive to the connection request (see [20] in FIG. 8C).

When receiving a connection request message from the MS 2, the connection information processor 35 illustrated in FIG. 3 performs a process for a connection with an NSP, which provides an information service to be connected. The NSP information table 36 retains information about an NSP with which the NAP in this ASN-GW 3 concludes the providers' contract. The NSP information table 36 has a constitution illustrated in FIG. 4, for example.

As illustrated in FIG. 4, the NSP information table 36 stores a provider code, provider name, NAI information for temporary access from MS to NSP, information on authentication server 5 (IP address, port number, etc.), and information on HA server 8 (IP address, port number, etc.) for each NSP provider with which a contract for providing the information service to the MS 2 via this NAP is concluded.

The connection information processor 35 has a contract determiner 35a and an assistance processor 35b when attention is given to functions of the connection information processor 35. The contract determiner 35a determines a state of the NAP contract (first contract), or the NSP contract (second contract), or the both at the terminal apparatus 2 that is the source of the line use request accepted by the message accept processor 34 (see [3] in FIG. 1). In concrete, the contract determiner 35a makes a determination by referring the NSP information table 36 on the basis of NAI information contained in the connection request message.

The assistance processor 35b performs an assisting process for concluding a contract found to be not yet concluded, according to a result of the determination by the contract determiner 35a. As a mode of the assisting process at the assistance processor 35b is classified into (1) a mode in which the NAP contract is concluded at the NAP before the NSP contract which is a contract for providing the information service is concluded at the NSP, and (2) a mode in which process of a contract including the NAP contract is performed at the NSP.

As the assisting process in the mode (1), the signing process of the NAP contract is asked of the OTA 4 when the contract determiner 35a finds that the first contract (NAP contract) is not yet concluded with the MS 2 that is a source of the line use request (see [5] in FIG. 2). On the other hand, as the assisting process in the mode (2), when the contract determiner 35a finds that the NSP contract (second contract) with the terminal apparatus 2 that is a source of the line use request is not yet concluded, information about an information service that can be provided from the information service providing apparatus via the ASN-GW 3 under the NSP contract is notified to the terminal apparatus 2 (see [8] in FIG. 2).

Figure 6:
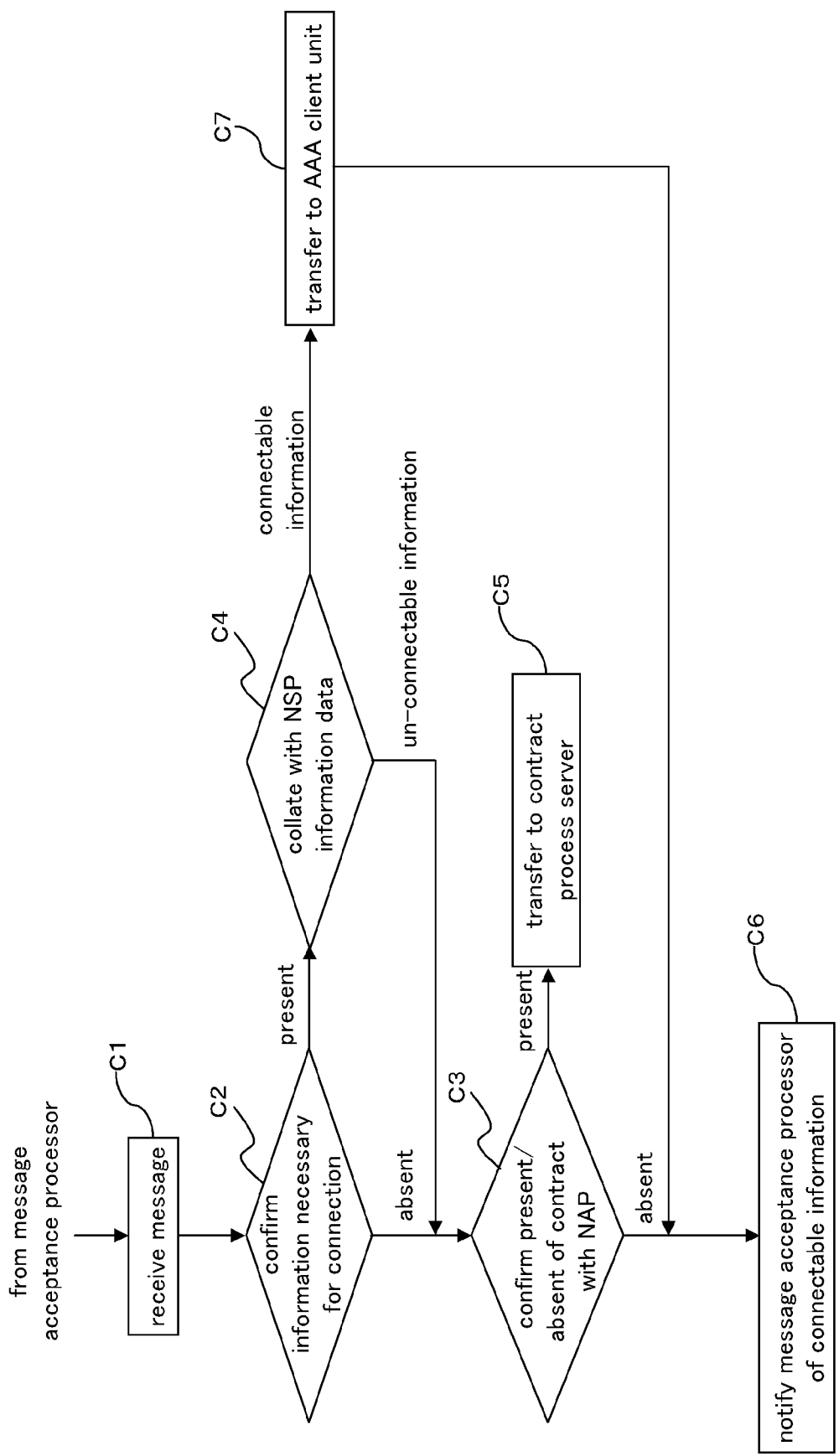
FIG. 6 is a flowchart for illustrating an operation of the ASN-GW according to the embodiment.

FIG. 6 is a flowchart for illustrating an operation of the above-mentioned connection information processor 35. As illustrated in FIG. 6, when the connection information processor 35 receives a message from the MS 2 accepted by the message acceptance processor 34 (step C1), the contract determiner 35a extracts NAI information contained in the message, and confirms presence/absence of information necessary for a connection with the NSP by comparing the extracted NAI information with the information table 36 (step C2). The MS 2 that has concluded the connection contract with the NSP has the authentication information used at the time of a line connection. The contract determiner 35a determines presence/absence of the above authentication information contained in the NAI information in the message as presence/absence of information necessary for the connection.

When the information necessary for the connection is not contained in the NAI information in the message, the contract assisting process is performed according to the mode (1) or the mode (2) ("absent" route at step C2). When the NAI information for authenticating the NSP with which the NAP of the ASN-GW 3 concludes the providers' contract is not contained although the NAI information necessary for the connection is extracted, the assistance processor 35b performs the contract assisting process according to the mode (1) or the mode (2), as well ("un-connectable information" route at step C4).

Figure 8A:
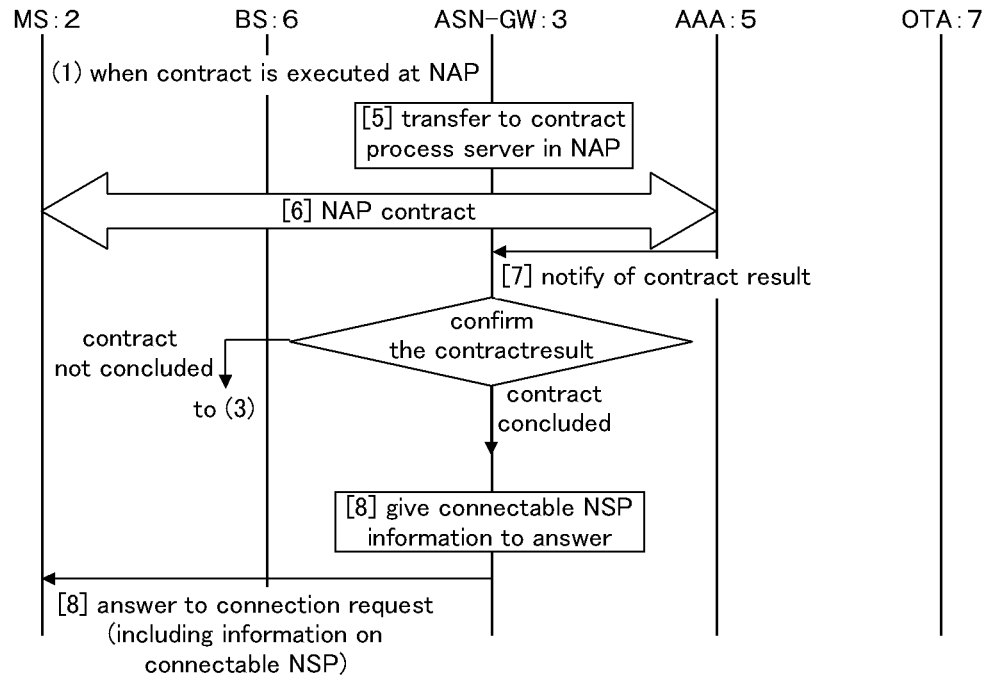
FIGS. 8A, 8B and 8C are sequence diagrams for illustrating an example of operations of the communication system according to the embodiment.
Figure 8B:
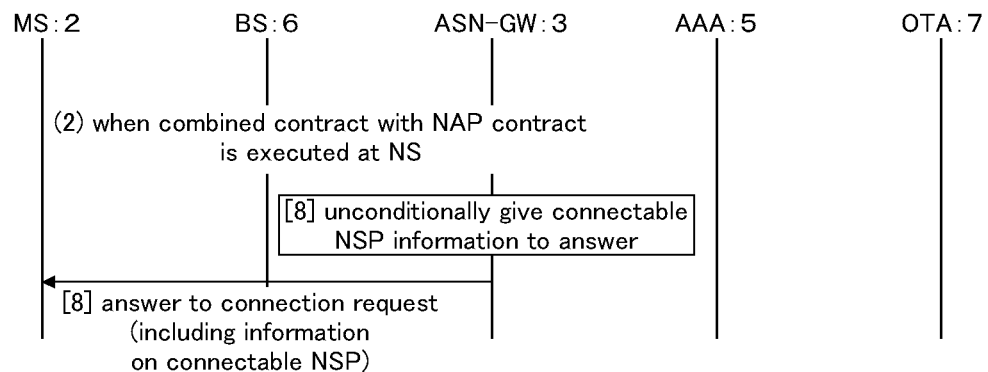
Figure 8C:
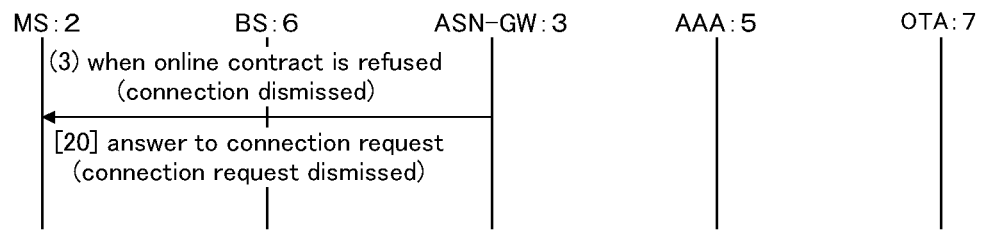

FIG. 8A is a diagram for illustrating the first assisting process mode (1) at the assistance processor 35b, while FIG. 8B is a diagram for illustrating a concrete example of the second assisting process mode (2).

In the first assisting process mode (1), when the ASN-GW 3 finds as a result of authentication of a connection request message from the MS 2 that the message is from the MS 2 that does not yet sign the contract (see [4] in FIG. 2), the ASN-GW 3 concludes a contract (NAP contract) for a wireless connection at the NAP with the terminal apparatus 2, as illustrated in FIG. 8A.

In concrete, when the contract determiner 35a finds that the NAP contract is not concluded between the NAP and the MS 2, the concluding process of the NAP contract is asked of the OTA 4 as the assisting process mode (1) (from "present" route at step C3 to step C5 in FIG. 6, see [5] in FIG. 2).

Namely, as illustrated in FIG. 8A, when it is found as a result of the authentication that the message is a connection request message from the MS 2 that does not yet sign the contract, this request is transferred to the contract process server 4 connected to the ASN-GW 3 (see [4] in FIG. 1, FIG. 2, and [5] in FIG. 8A). At the contract process server 4, the procedure for the NAP contract with the MS 2 can be proceeded (see FIG. 2, and [6] and [7] in FIG. 8A).

When the contract process at the OTA 4 is not performed as the assisting process mode (2), the assistance processor 35b notifies the MS 2 of information ("connectable information") about an available information service that can be provided from the information service providing apparatus via the ASN-GW 3 under the NSP contract (from "absent" route at step C3 to step C6, see [8] in FIG. 2).

In concrete, as illustrated in FIG. 8B, a combined contract of a contract (NSP contract) for providing an information service and a contract (NAP contract) for a line connection is concluded with the MS 2 at the NSP. In concrete, the ASN-GW 3 unconditionally embeds information on a connectable NSP in an answer to the connection request message, and sends back the answer to the MS 2 (see FIG. 2, and [8] in FIG. 8B). Note that temporary NAI information on each connectable NSP can be contained in the information on the connectable NSP.

As illustrated in FIG. 3, the MS 2 has an information receiver 21 receiving information on a connectable NSP from the ASN-GW 3, a display controller 22 displaying a list of available information services that can be provided from the NSPs via the ASN-GW 3 under the NSP contract on the basis of the information received by the information receiver 21, and an application transmitter 23 transmitting application information for an information service selected to be received by the MS 2 among the information services displayed as a list by the display controller 22 (see [10] in FIG. 2).

The application for an information service transmitted from the application transmitter 23 is accepted by the message acceptance processor 34 in the ASN-GW 3 as the re-transmitted connection request message (step C1 in FIG. 6). Here, this connection request message can contain temporary NAI information as information necessary for the connection.

In the ASN-GW 3 having received the connection request message, the contract determiner 35a in the connection information processor 35 can confirm authentication information to an NSP that is the object of the connection request. Accordingly, the assistance processor 35b obtains an IP address and the like of the authentication server 5 of the NSP that is the object of the connection request from the information table 36, and can transfer the connection request message to the authentication server 5 of the NSP via the AAA client unit 37 ("present" route at step C2 in FIG. 6, from "connectable information" route at step C4 to step C7, see [11] and [12] in FIG. 2).

When receiving the application information from the application transmitter 23, the assistance processor 35b can transmit pre-contract authentication information (temporary NAI information) for a connection with the MS 2 to the NSP that provides the applied information service. Whereby, the contract process that the MS 2 needs can be proceeded by the OTA 7 through authentication with the temporary NAI information at the authentication server 5 in the NSP.

The AAA client unit 37 illustrated in FIG. 3 transfers the connection request message from the connection information processor 35 to the authentication server 5 of the NSP. Additionally, the AAA client unit 37 performs a process on a signal inputted from the NSP with which the providers' contract is concluded via the hardware unit 31, the OS unit 32 and the middleware unit 33, and transfers a message relating to the connection information process to the connection information processor 35.

Figure 7B:
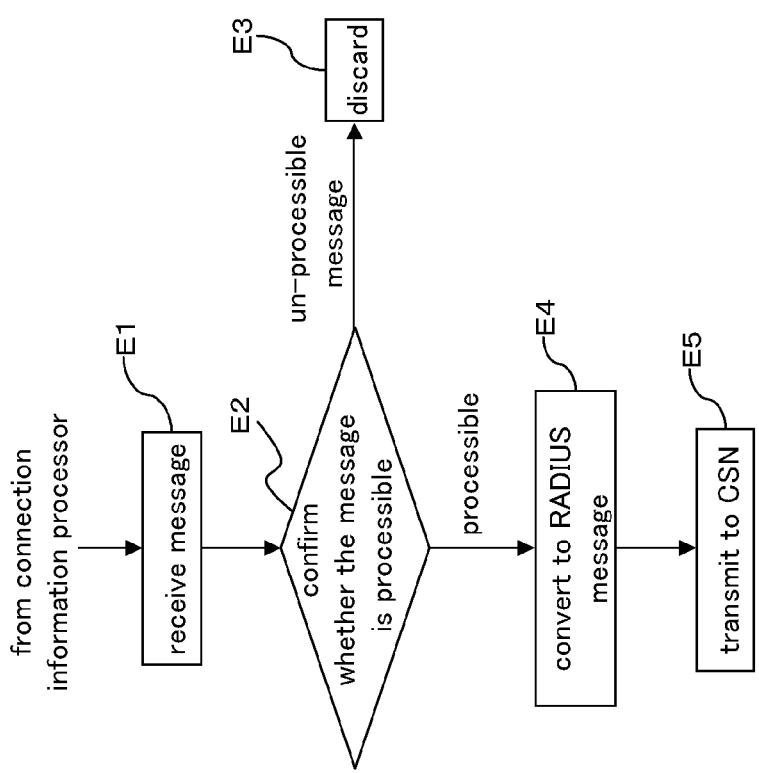
FIGS. 7A and 7B are flowcharts for illustrating operations of the ASN-GW according to the embodiment.
Figure 7A:
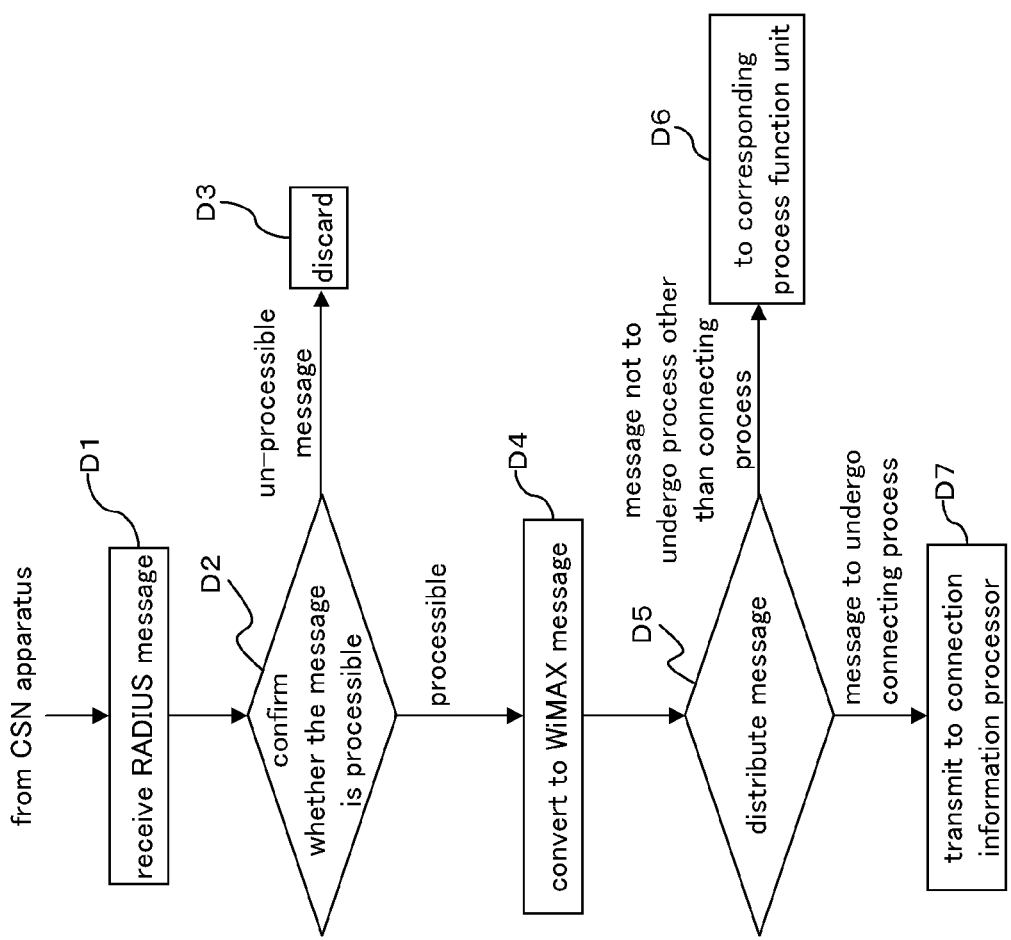

FIGS. 7A and 7B are flowcharts for illustrating operations of the AAA client unit 37. As illustrated in FIG. 7A, when receiving a RADIUS message from the authentication server 5 (step D1), the AAA client unit 37 converts a processible message into a WiMAX message (step D4) while excluding un-processible messages (steps D2 and D3).

Thereafter, messages are distributed to process function units according to the types of the messages (steps D5 and D6). Particularly, a message distributed to the connection information processor 35 is outputted to the connection information processor 35, and transmitted to the MS 2 (from "message to undergo connecting process" at step D5 to step D7, see [18] and [19] in FIG. 2).

When receiving a message to be transmitted to the authentication server 5 from the connection information processor 35 (step E1) as illustrated in FIG. 7B, the AAA client unit 37 converts a processible message into a RADIUS message (step E4) while excluding unprocessible messages (steps E2 and E3), and transmits the message to the authentication server 5 via the middleware unit 33, the OS unit 32 and the hardware unit 31 ("transmit to CSN" at step E5).

[A3] Working Effects

The communication system according to this embodiment has the MS 2, the ASN-GW 3, the contract servers 4 and 7, the BS 6, the authentication server 5 and the HA server 8. In the communication system, the MS 2 performing wireless communications outputs a line use request to the ASN-GW 3 providing a wireless line whose wireless communication is defined to the MS 2 under the first contract (NAP contract) with the MS 2. The ANS-GW 3 accepts the line use request from the MS 2 by the message acceptance processor 34, determines a state of conclusion of the first contract with the MS 2 which is a source of the accepted line use request, determines a state of conclusion of the second contract (NSP contract) with the NSP (servers 5, 7 and 8) providing an information service to the MS 2 over the wireless line provided by the ASN-GW 3, and performs the assisting process for the concluding process of an un-signed contract according to a result of the determination on the state of conclusion of the first contract, or the second contract, or the both.

As above, according to the embodiment, owing to the contract determiner 35a and the assistance processor 35b of the ASN-GW 3, the WiMAX user using the MS 2 can freely select an NAP and an NSP from the purchased terminal apparatus (MS 2) that does not yet conclude the contracts without beforehand signing the contracts by some means, thereby concluding the WiMAX communication contract. In other words, it is possible to solve problems that it is necessary for the user to beforehand obtain a contract and information necessary for the contract before using the purchased unconcluded terminal, and that there is not a system in which the user of a purchased unconcluded terminal apparatus can sign the online contract through this terminal apparatus.

Further, since the MS 2 can be notified of a NSP that can conclude the contract from the NAP through the assistance processor 35b, the user of the MS 2 can examine a state of the providers' contract between an FA (Foreign Agent) of the NAP and an HA (Home Agent) of the NSP in WiMAX, which performs mobile management on the assumption of the Mobile IP technique, on the side of the MS 2 before signing the contract, which can improve the utility of the communication system 1 for the user of the terminal apparatus 2.

[B] Others

As having been described in detail the embodiment, the embodiment can be modified in various ways without departing from the spirit and scope of the embodiment.

As types of the contracts to be assisted by the assistance processor 35b in the above ASN-GW 3, there is a contract concluded at the apparatus 7 in the NSP other than the contract concluded at the apparatus 4 in the NAP. As the types of these contracts concluded at the apparatuses 4 and 7, procedures of the NAP contract, the NSP contract, a combined contract of these contracts and other accompanying contents can be suitably and flexibly operated according to agreements between the providers.

Note that disclosure of the above embodiment enables a person skilled in the art to manufacture the apparatus.

As above, the user of an un-concluded terminal apparatus can freely select and sign the first contract and the second contract within a possible range through the terminal apparatus without beforehand signing the contract by any means.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A communication system comprising:
   a terminal apparatus(TA);
   a base station (BS) configured to transmit and receive a radio signal to and from the TA;
   an access service network gateway (ASN-GW) configured to perform an accepting process of a connect request at a time of an initial connection with the TA on the basis of a network access provider (NAP) contract;
   a NAP contract process server configured to perform, upon receiving a contract request from the ASN-GW, a contract process between the NAP and the TA which does not yet sign the NAP contract;
   an authentication server (AAA) configured to confirm a state of a network service provider (NSP) contract with the TA; and
   a NSP contract process server configured to perform, upon receiving a contract request from the AAA, a contract process between the NSP and the TA which does not yet sign the NSP contract, wherein
   the TA has:
      a memory configured to store one or more of NAP information to be used for authenticating at the NAP and configured to store one or more of NSP information to be used for authenticating at the AAA when the TA has signed the NSP contract; and
      a processor configured to:
         trasmit a connect request message including a network access identifier (NAI) by using a wireless interface, wherein the NAI includes the NAP information selected from the one or more of NAP information stored in the memory and the NSP information stored in the memory, and the NSP information is set as null or invalid data when the TA does not yet sign the NSP contract,
   the BS has a processor configured to:
      receive the connect request message from the TA; and
      transmit the connect request message received from the TA to the ASN-GW,
   the ASN-GW has a memory configured to store one or more of the NSP information, and a processor configured to:
      receive the connect request message from the TA through the BS, the connect request message including the NAI which indicates that the TA does not yet sign both of the NAP contract and the NSP contract;
      transmit the contract request to the NAP contract process server for performing the contract process between the TA and the NAP when the NAI included in the connect request message indicates that the TA does not yet sign the NAP contract;
      transmit, after the contract process at the NAP contract process server has completed, a list of the NSP information stored in the memory to the TA through the BS when the NAI included in the connect request message indicates that the TA does not yet sign the NSP contract, thereby cause the TA to transmit the connect request message with the NSP information selected from the list of the NSP information;
      receive the connect request message from the TA through the BS, the connect request message including the NAI which includes the NAP information and the NSP information; and
      transmit the connect request message with the NAI including the NSP information to the AM when the NAI included in the connect request message indicates that the TA has signed the NAP contract,
   the AAA has a processor configured to:
      receive the connect request message with the NAI including the NSP information from the ASN-GW; and
      transmit the contract request to the NSP contract process server for performing the contract process between the TA and the NSP when the NAI included in the connect request message indicates that the TA does not yet sign the NSP contract, and
   the NSP contract process server has a processor configured to:
      receive the contract request from the AAA; and
      perform, upon receiving the contract request from the AAA, the contract process between the NSP and the TA which does not yet sign the NSP contract.

* * * * *